(No Model.) 3 Sheets—Sheet 1.

R. F. RICE.
PHOTOGRAPHIC CAMERA.

No. 495,566. Patented Apr. 18, 1893.

WITNESSES:
Edward Rowland
E. Simpson

INVENTOR
Robert F Rice
BY
Phillips Abbott
ATTORNEY (No Model.) 3 Sheets—Sheet 2.
R. F. RICE.
PHOTOGRAPHIC CAMERA.

No. 495,566. Patented Apr. 18, 1893.

WITNESSES:
Edward C. Rowland.
E. Simpson

INVENTOR
Robert F. Rice
BY Phillips Abbott
ATTORNEY (No Model.)  3 Sheets—Sheet 3.
R. F. RICE.
PHOTOGRAPHIC CAMERA.

No. 495,566. Patented Apr. 18, 1893.

WITNESSES:
Edward C. Rowland
E. Simpson

INVENTOR
Robert F. Rice
BY
Phillips Abbott
ATTORNEY

UNITED STATES PATENT OFFICE.

ROBERT F. RICE, OF HARTFORD, CONNECTICUT.

PHOTOGRAPHIC CAMERA.

SPECIFICATION forming part of Letters Patent No. 495,566, dated April 18, 1893.

Application filed November 19, 1892. Serial No. 452,496. (No model.)

*To all whom it may concern:*

Be it known that I, ROBERT F. RICE, a citizen of the United States, and a resident of Hartford, in the county of Hartford and State of Connecticut, have invented certain new and useful Improvements in Photographic Cameras, of which the following is a specification.

My invention relates to improvements in magazine photographic cameras and it consists in the construction and arrangement of the parts as hereinafter described and recited in the claims hereof.

In some respects this application resembles that filed by me July 29, 1892, Serial No. 441,623. The mechanism, however, in this present case is in many respects and for certain forms of camera much more desirable than that shown and described in my former case.

Figure 1:
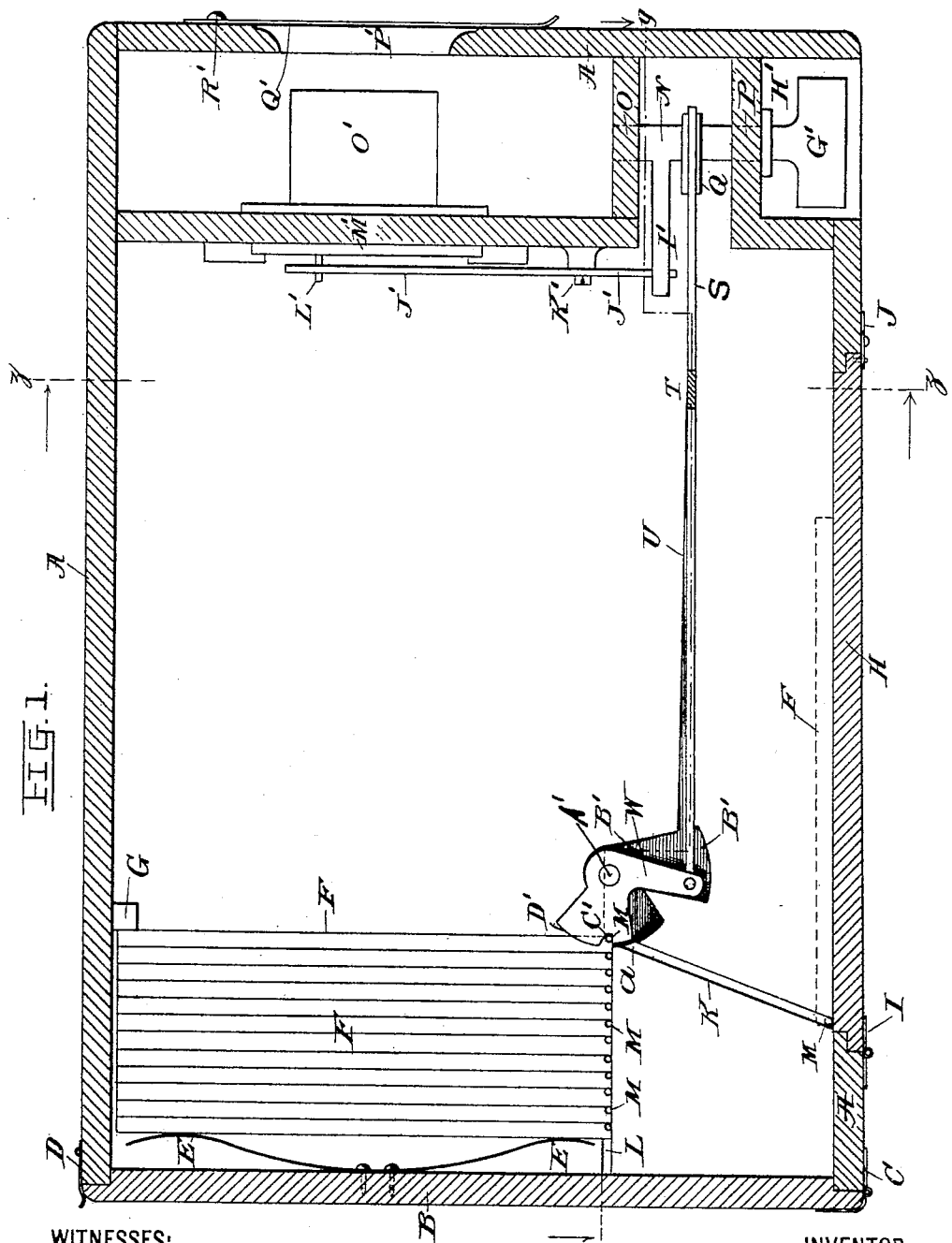
Figure 2:
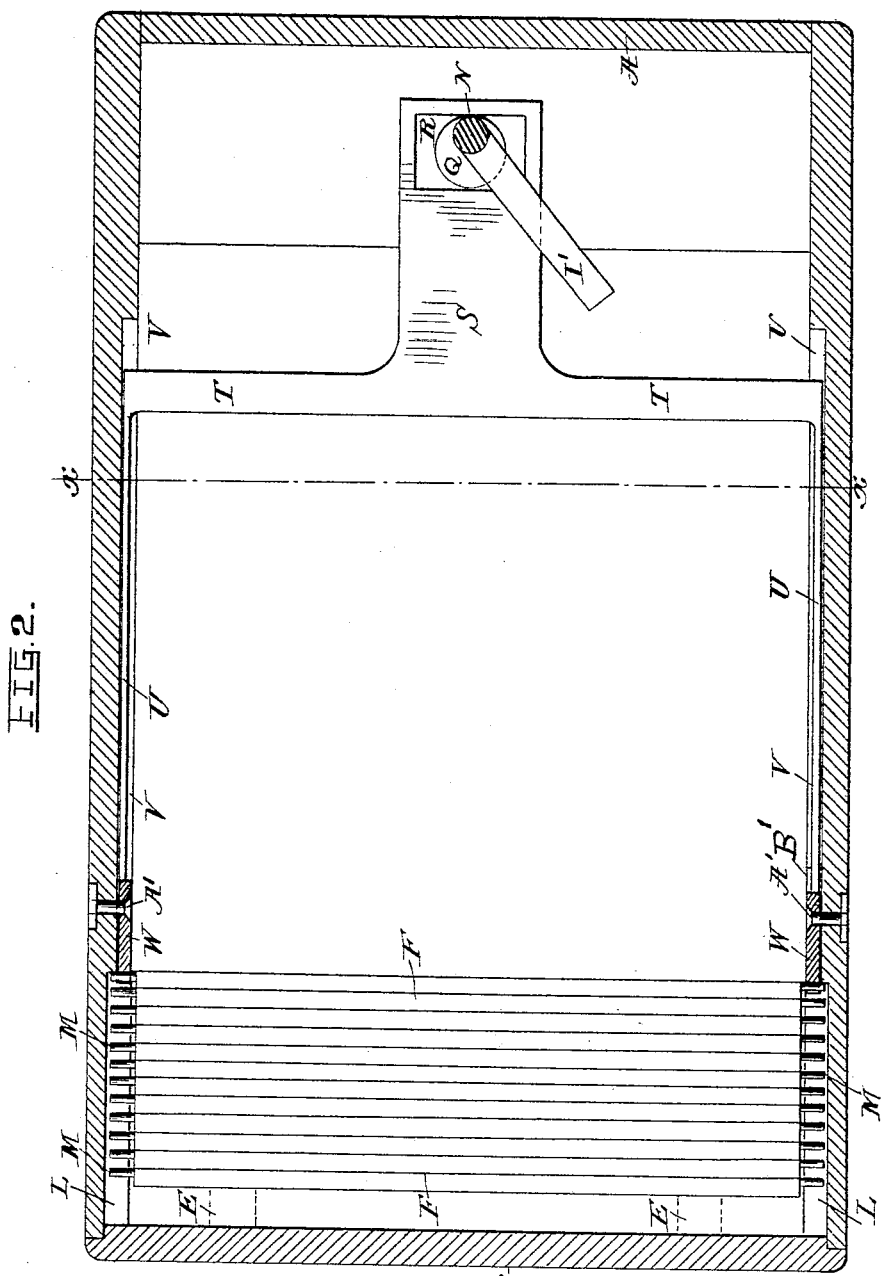
Figure 3:
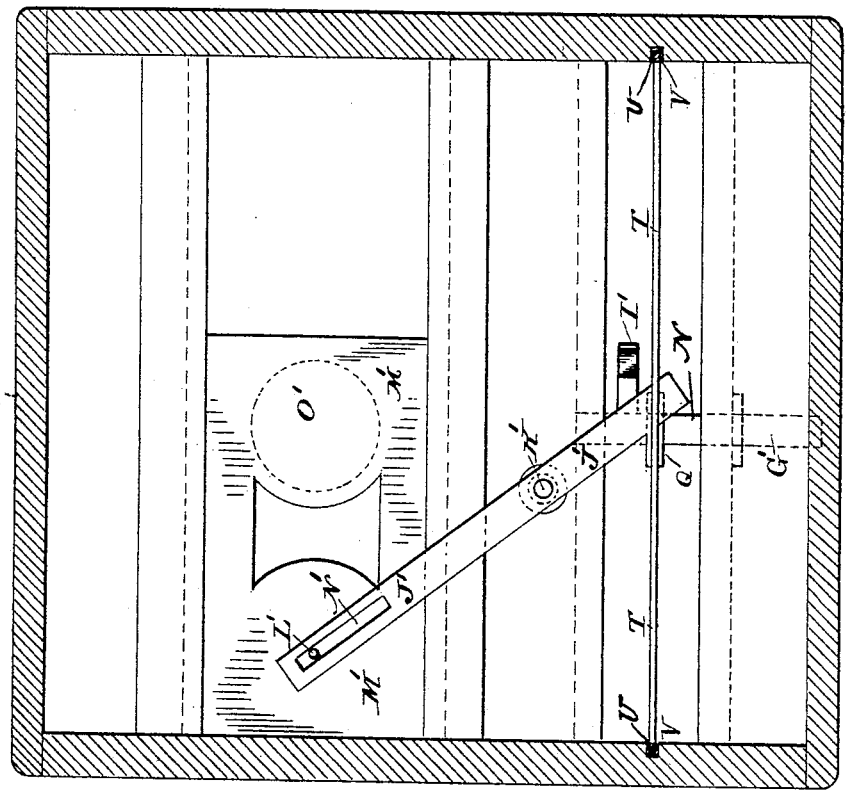
Figure 4:
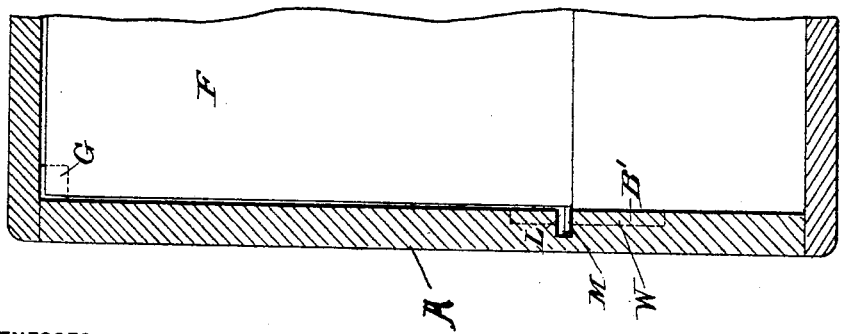

In the drawings hereof: Figure 1 illustrates a longitudinal vertical section of the invention, taken on the line $x\,x$ in Fig. 2. Fig. 2 is a plan view taken on the line $y\,y$ in Fig. 1. Fig. 3 is a vertical section taken on the line $z\,z$ of Fig. 1 looking to the right as indicated by the arrows. Fig. 4 is a detail showing the devices for supporting the plates in the exposure chamber.

A represents the camera box. It may be made of any suitable material.

B is the rear end of the box. It is made in the form of a door, being hinged at C and having a catch D on the upper side, so that the entire rear end of the camera box may be swung open for convenient insertion of the plate holders.

E is an ordinary pressure spring, used to press the plate holders F forwardly into proper focal position.

G, G are two stops, one on each side of the camera, against which the upper corners of the plate holders F are pressed by the spring E into the proper focal plane.

H is a door in the bottom of the camera hinged at I and provided with a catch J.

K, K are grooves cut in the sides of the camera box, there being one on each side. They are preferably set at an angle as shown. The upper edge of these grooves extend to the lower edge of other grooves L, L, which are cut in the sides of the camera, and in which laterally projecting pins or wires M, M, which are attached to the bottom edge of the plate holders slide. These pins are introduced into the grooves L when the plate holders are put into the camera. The rear door B when swung open exposes the rear ends of the grooves, so that the pins can be readily inserted in them when the plate holders are put into the camera.

N is a vertically arranged shaft supported at O and P upon the wood work of the camera.

Q is an eccentric, fastened on the shaft, which oscillates in the opening R, made in the portion S of the longitudinal sliding frame T, T. This frame is provided with two rearwardly extending arms or rods U, U which slide in grooves V, V made in the sides of the camera box, whereby the frame T is supported and is allowed longitudinal movement. The rods U, U are pivoted to bell cranks W, W, which are pivoted at A' to the sides of the camera, respectively, within the recesses B' B', so that their inner surfaces are flush with the inner surfaces of the sides of the camera box. One arm of the bell cranks W is provided with a notch C' and a flat concentric surface D' above the notch.

G' is a thumbpiece or key on the lower end of the shaft N. It is protected within a recess H', made in the forward under side of the camera box and is accessible from the exterior of the camera.

I' is an arm fastened on the shaft N, which turns with it and engages the lower end of a lever J', which is pivoted at K' to the frame of the camera, and this lever engages with the shutter M' of the camera by means of pin L' which is fastened to the shutter. The pin moves during the operation of the shutter M' through a slot N' made in the lever J'.

O' is the lens tube or casing.

P' (see Fig. 1) is the exposure aperture and Q' is an ordinary exterior swinging shutter which is pivoted at R' to the front of the camera.

The operation of the camera is as follows. The plate holders containing the sensitized surfaces, which all face forwardly, are inserted in the rear chamber or portion of the camera box, as stated, the end of the camera box being opened for that purpose, the pins M, on the lower edges of the plate holders resting in the grooves L, L. When the door or end of the camera box B is closed, the spring pusher E pressing against the rear side of the most rearwardly plate holder, forces them all close to one another, the forward one being in exactly the proper focal plane supported at its upper corners by the supports G, G and at its lower corners by its pins M, M, which rest in the notches C' C' of the bell cranks W. The bottom of these notches are made to coincide in a vertical plane with the rear surfaces of the supports, G, G, so that the most forward plate is located in the proper focal plane and the upper edges of the recesses B', in which the bell-cranks are placed limit the movement of the bell-cranks so that the notches C' exactly register with the grooves L. The shutter having been previously put under tension or set in a manner which will be presently explained, the parts are in position to take a picture, and the exterior swinging shutter Q' being swung aside out of the way, the latch which holds the shutter (which may be of any convenient form and which is not shown on the drawings because it is so well known and understood) is pressed and then the spring or other means for throwing the shutter, immediately throws it from one side to the other exposing the plate in transit thus taking the picture. The operator now, to transfer the plate upon which the picture has been taken, again closes the exterior shutter Q' and taking hold of the key G' gives it a half turn. Thereupon the eccentric Q moves the frame comprising the parts S, T, U, U forwardly and the rods U, U pulling upon the bell cranks W rock them upon their pivots, whereupon the most forward plate holder F, by reason of the engagement of its pins M in the notches C' of the bell cranks is carried downwardly until the upper corners of the plate holder pass below the supports G, G, whereupon the pressure of the spring E, which is communicated through the series of plate holders, presses the most forward plate holder forwardly, which being confined at its lower edge by the engagement of its pins M in the notches in the bell cranks, pivots on these pins and swings forwardly into the camera box. By this time however, the notches in the bell cranks have moved so as to coincide with the upper ends of the grooves K, and the flat surface D' of the bell cranks have come into such a position that the pins M on the next succeeding plate holder rest against and are supported by them. Consequently the pins M of the first plate holder now drop out from the notches and entering the grooves K slide down them and the plate and its holder fall face downward into the chamber or space in the lower portion of the camera, as indicated in dotted lines in Fig. 1. During the foregoing operation the arm I', which as stated, forms part of or is rigidly fastened to the shaft N engaging with the short arm of the lever J' carries the shutter back again to its original or set position, thus the shutter is set for a second operation. The thumbscrew or key G' is now turned in the reverse direction until the bell cranks are stopped against the stops E', upon which the pins M of the second plate holder are pressed forwardly into the notches C' of the bell cranks, and it, in turn, assumes the proper focal position for exposure. It will be observed that the exterior shutter Q' has nothing to do with the taking of the pictures, and is not the shutter of the camera which is operated for the purpose of making the exposures, but it is simply an auxiliary means for excluding the light during the passage of the regular shutter N' across the exposure aperture during the resetting operation. And it will also be observed that the mechanism composing my present improvement is exceedingly simple and positive in action.

Having described my invention, I claim—

1. The combination in a camera having an exposure chamber and a storage chamber both adapted to contain a number of plate-holders, of a key or like device upon the exterior of the camera, a crank oscillated by movement of the key, a frame connected with the crank, pivoted bell-cranks, one on each side of the camera connected to said frame and having notches for the reception of projections from the plate-holders, and supports for the upper sides of the plate-holders in the same focal plane as the notches in the bell-cranks, substantially as set forth.

2. The combination in a camera having an exposure chamber and a storage chamber both adapted to contain a number of plate-holders, of a key or turn button, accessible from the exterior of the camera, which is fastened on a shaft, to which a crank or eccentric is attached, a horizontally arranged frame, supported on the sides of the camera and engaging with the crank or eccentric, pivoted bell-cranks connected to said frame having notches for the reception of projections from the plate-holders, supports for the bottom of the plate-holders in line with the notches in the bell-cranks and other supports for the upper part of the plate-holders in the same focal plane as the notches in the bell-cranks substantially as set forth.

3. The combination in a camera having an exposure chamber and a storage chamber both adapted to contain a number of plate-holders, of a key or turn button, accessible from the exterior of the camera, a crank or eccentric oscillated by the turn button, a frame connected with the eccentric or crank and given longitudinal reciprocal movement by it, pivoted bell-cranks connected to said frame having notches for the reception of projections upon the plate-holders and an arm connected to the key or turn button adapted to engage with the pivoted lever and said pivoted lever, one end of which engages with the shutter, substantially as set forth.

4. The combination in a camera having an exposure chamber and a storage chamber both adapted to contain a number of plate-holders, of a key or turn button operated from the exterior of the camera, a crank or eccentric connected to said key, a frame horizontally disposed and supported on the sides of the camera and connected at one end with said crank or eccentric and at the other end with pivoted bell-cranks having notches for the reception of projections upon the plate-holders, supports for the upper sides of the plate-holders in the same focal plane as the notches in the bell-cranks, an arm connected to the key or turn button, a pivoted lever adapted to engage with the said arm at one end and connected with the shutter at the other end and a shield to exclude the light during the resetting of the shutter, substantially as set forth.

Signed at Hartford, in the county of Hartford and State of Connecticut, this 16th day of November, A. D. 1892.

ROBERT F. RICE.

Witnesses:
D. J. MURPHY,
TIMOTHY A. SCANLON.